(12) United States Patent
Schreiber

(10) Patent No.: US 8,774,969 B2
(45) Date of Patent: Jul. 8, 2014

(54) METHOD FOR ALLOWING A MANIPULATOR TO COVER A PREDETERMINED TRAJECTORY, AND CONTROL DEVICE FOR CARRYING OUT SAID METHOD

(75) Inventor: Günter Schreiber, Friedberg-Derching (DE)

(73) Assignee: Kuka Laboratories GmbH, Augsburg (DE)

( * ) Notice: Subject to any disclaimer, the term of this patent is extended or adjusted under 35 U.S.C. 154(b) by 527 days.

(21) Appl. No.: 13/140,123

(22) PCT Filed: Nov. 3, 2009

(86) PCT No.: PCT/EP2009/007874
§ 371 (c)(1),
(2), (4) Date: Jun. 16, 2011

(87) PCT Pub. No.: WO2010/069430
PCT Pub. Date: Jun. 24, 2010

(65) Prior Publication Data
US 2012/0185089 A1    Jul. 19, 2012

(30) Foreign Application Priority Data

Dec. 17, 2008 (DE) .......................... 10 2008 062 622
Feb. 3, 2009 (DE) .......................... 10 2009 007 181

(51) Int. Cl.
*G05B 19/18* (2006.01)

(52) U.S. Cl.
USPC ........................................................ 700/250

(58) Field of Classification Search
USPC .................................. 700/257, 250, 264, 245
See application file for complete search history.

(56) References Cited

U.S. PATENT DOCUMENTS

| | | | |
|---|---|---|---|
| 4,396,987 A | 8/1983 | Inaba et al. | |
| 4,621,332 A | 11/1986 | Sugimoto et al. | |
| 4,860,215 A | 8/1989 | Seraji | |
| 4,999,553 A * | 3/1991 | Seraji ........................... | 700/245 |
| 6,317,651 B1 | 11/2001 | Gerstenberger et al. | |

(Continued)

FOREIGN PATENT DOCUMENTS

| | | |
|---|---|---|
| DE | 32 11 992 A1 | 10/1983 |
| DE | 195 47 121 A1 | 5/1996 |
| JP | 59157715 A | 9/1984 |

OTHER PUBLICATIONS

"Tactile Gestures for Human/Robot Interaction," Voyles, Jr. et al., Proc. of IEEE/RSJ Intelligent Robots and Systems Conference, vol. 3 (1995) pp. 7-13.

(Continued)

*Primary Examiner* — Khoi Tran
*Assistant Examiner* — Adam Mott
(74) *Attorney, Agent, or Firm* — Schiff Hardin LLP

(57) ABSTRACT

In a method for allowing an end effector of a robotic manipulator to travel along a predetermined path or trajectory, wherein the manipulator has a null space with respect to the predetermined trajectory with at least two manipulator positions associated with the same end effector position, a placement of the manipulator in null space is detected and, in a processor, a process variable of the end effector is automatically modified according to the detected placement.

16 Claims, 2 Drawing Sheets

(56) References Cited

U.S. PATENT DOCUMENTS

| | | |
|---|---|---|
| 6,385,508 B1 | 5/2002 | McGee et al. |
| 7,646,161 B2 | 1/2010 | Albu-Schäffer et al. |
| 2002/0120363 A1 | 8/2002 | Salisbury et al. |
| 2005/0246062 A1 | 11/2005 | Keibel |
| 2006/0293790 A1 | 12/2006 | Gienger |
| 2008/0188985 A1 | 8/2008 | Sakano |

OTHER PUBLICATIONS

"Programming by Touch: The Different Way of Human-Robot Interaction," Grunwald et al., IEEE Trans. on Industrial Electronics, vol. 50, No. 4, (2003) pp. 569-666.

"Force Control of Redundant Robots in Unstructured Environment," Nemec et al., IEEE Trans. on Industrial Electronics, vol. 48, No. 1 (2002) pp. 253-260.

* cited by examiner

METHOD FOR ALLOWING A MANIPULATOR TO COVER A PREDETERMINED TRAJECTORY, AND CONTROL DEVICE FOR CARRYING OUT SAID METHOD

BACKGROUND OF THE INVENTION

1. Field of the Invention

The present invention concerns: a method for an end effector of a manipulator—in particular of a robot—to travel a predetermined path; a control device to implement such a method; and a manipulator, in particular a robot, with such a control device.

2. Description of the Prior Art

A typical task of a manipulator is to travel a predetermined path with its end effector. For example, the path can thereby have been predetermined by direct programming ("direct teaching"), i.e. the manual guidance of the end effector in desired attitudes in a learning mode, or via indirect programming ("off-line programming"), i.e. the creation of desired courses of the joint angles corresponding to the inverse kinematics of the desired end effector attitudes.

The attitude represents a position and/or orientation of the end effector that, for example, can be described by a vector $x \in R^n$ of the dimension n. For example, the path of the end effector can then be parameterized via a path parameter s ($x = x(s)$) that the manipulator executes in normal operation corresponding to a time profile $ds/dt(t)$ so that the end effector travels the path with a corresponding path velocity $dx/dt$.

Since manipulators—in particular industrial and lightweight construction robots such as the robots of LBR I-IV series from the German Center for Air and Space Travel (DLR)—can travel very quickly in normal operation, and this hinders a direct examination of a path or a prompt manual emergency stop given incorrect paths. It is known for the operator to manually change (for example to reduce) the path velocity during the travel of the path in order to examine specific path segments or to test the interaction with other manipulators. The dynamic limits of the manipulator can be successively checked out by increasing the path velocity beyond normal operation in a targeted manner.

This change of the path velocity during the operation ("override") has previously been entered into the controller of the manipulator manually via an operating element at a monitoring board. However, this is complicated, in particular when an operator wants to examine a joining process of a robot that is not in proximity, for example, and for this wants to correspondingly decrease the path velocity. In this case he must operate the operating element manually.

In addition or as an alternative to the path velocity, it can be desirable to also vary other process variables of the a manipulator and/or the process to be implemented by it. For example, given direct programming of a joining or welding process a contact pressure force of the manipulator or, respectively, a welding current at a work point should be adjustable by the operator.

SUMMARY OF THE INVENTION

An object of the present invention is to enable a more comfortable modification of at least one process variable.

With regard to a predetermined path of its end effector, a manipulator has a solution space that includes all manipulator positions that are associated with the same end effector attitude. If the manipulator cannot describe an end effector attitude, the solution space devolves to the empty set. For example, if a three-dimensional position and orientation of the end effector in space that can be described by three respective coordinates—for instance Cartesian or polar coordinates or Euler or Cardan angles—can be realized bijectively via a six-axis manipulator, the solution space correspondingly contains only one position.

However, if the number f of degrees of freedom of a manipulator exceeds the dimension n of the predetermined attitude of the end effector by at least 1 (f>n), this manipulator is redundant (possibly multiply redundant) with regard to this predetermined path, meaning that its solution space comprises at least two manipulator positions associated with the same end effector attitude. Such a solution space extended by multiple positions is designated as a "null space" in the following. This can result from the situation that the manipulator has seven or more degrees of freedom than the lightweight construction robots LBR III or IV of the DLR that are mentioned in the preceding. Moreover, the dimension n of the predetermined attitude of the end effector can be smaller than six, for example in the event that it does not depend on the orientation of the end effector with regard to a spatial axis, for instance given drilling in the direction of the last rotation axis of a six-arm industrial robot. In this case the manipulator is redundant with regard to the path (i.e. task redundant) and contains infinitely many manipulator positions associated with the same end effector attitude $x \in R^5$.

The basis for the present invention is to utilize such a redundancy of a manipulator in order to modify or predetermine one or more process variables of the manipulator.

These can be process variables that (co-)define a process implemented by the manipulator. For example, the welding current of an electrode holder directed during a welding process and its path velocity represent process variables (co-)defining the welding process. In a joining process, for example, the contact pressure force with which the manipulator inserts a work piece represents a process variable (co-)defining the joining process. In an enameling process, the path velocity of the end effector of the manipulator and the dye ejection in turn represent process variables (co-)defining the enameling process. In the following the present invention is explained in detail using the path velocity as an example of a process variable to be modified. However, the present invention is not limited to this; rather, arbitrary process variables can be modified. Therefore, the term "process variable" in the sense of the present invention comprises any (in particular physical) variable that can be adjusted or varied by a user in connection with a manipulator, for example the brightness of a light source that is carried by the manipulator and/or illuminates its working range; a temperature of a working cell of the manipulator; and/or acoustic indication or the like.

In a preferred embodiment of the present invention, the end effector always moves into the predetermined attitude corresponding to the predetermined path in a known manner via a control device. For example, for this purpose the control device can have a corresponding attitude regulation for the end effector. The term "controller" therefore also presently comprises a regulation, i.e. an output of control values under consideration of desired and real values and a deviation between these.

Furthermore, even given a modification of the manipulator position in null space by an operator the predetermined path can thereby be retraced. Various embodiments of admittance regulations and impedance regulations for this are known that enable a movement of the manipulator by the operator. For example, if a six-arm industrial robot should retrace a path with its end effector, in which path the orientation of the end effector is not predetermined with regard to the last rotation axis of the robot, a position regulation for this rotation axis can be shifted so slightly (via corresponding selection of the proportionality factor of a pure proportion regulator) that an operator can manually rotate the end effector around this axis. If the seven-axis LBR III cited in the preceding retraces a path, given corresponding admittance regulation a user can, for example, manually push the elbow out of its position, wherein the admittance regulation furthermore directs an end effector into an attitude along the predetermined path, which attitude is unambiguously predetermined by three position coordinates and three angle coordinates. Such a movement of the manipulator by the operator thus always leads to a placement of the manipulator in its null space, i.e. a difference between two manipulator positions of the null space.

According to the invention, when an end effector of a manipulator travels a predetermined path (which manipulator has—with regard to the predetermined path—a null space with at least two manipulator positions associated with the same end effector), i.e. is redundant with regard to the predetermined path, a placement of the manipulator in the null space is registered and at least one process variable (for example the path velocity of the end effector) is modified corresponding to the detected placement.

The process variable can thus hereby be varied in a simple and direct manner without varying the attitude of the end effector with regard to the path to be traveled, in that the placement of the manipulator in null space is used as a measure of a desired process variable modification. The operator can directly contact the manipulator, and no operating element of the monitoring board or the like must be actuated to modify the process variable.

Such a command input can advantageously be operated intuitively. For example, the movement of the manipulator in the direction of the path can increase the velocity, reduce it counter to the path direction or even modify its algebraic sign such that the end effector travels backwards on the predetermined path. For example, pushing the elbow of the LBR III or rotating an end flange of an industrial robot in its last pivot joint in one direction can similarly produce a velocity or contact pressure force increase; a pull or rotation in the opposite direction can produce a decrease of the path velocity or the contact pressure force.

The change of the path velocity $dx/dt$ can be realized in various ways. For example, to increase the velocity a predetermined trapezoidal velocity profile $ds/dt(s)$ can be proportionally shortened in the direction of the time axis, extended relative to the velocity reduction. Similarly, the next attitude of the predetermined path that is to be approached can be supplied earlier or later as a desired value to a simple proportional differential regulation in order to increase or reduce the velocity.

One of the manipulator positions of the null space is preferably predetermined as a desired manipulator position at every end effector attitude of the predetermined path. For example, for this one of the manipulator positions of the null space can be selected corresponding to suitable criteria in the path planning, for instance the manipulator position whose approach requires a minimal time or energy cost or whose difference is least at a previous position. For example, the last cited criterion can avoid an unwanted shift between different robot positions upon approaching the next attitude. Given direct programming via manual direction of the manipulator ("direct teaching"), the desired position inherently results from the respective position into which the operator brings the manipulator during the teaching.

The difference between this desired position and the actual manipulator position can then be detected as a placement. If the manipulator is moved out of its desired position by the operator, this correspondingly leads to a persistent placement as long as the manipulator is not in the desired position again. For example, if a defined, constant angle setting of the end effector of a six-axis robot is predetermined as a desired setting relative to its last rotation axis, a persistent rotation of the end effector in this rotation axis thus leads to a constant placement and a corresponding modification of the process variable, for example the path velocity.

In a first embodiment of the present invention the process variable can correspond to the registered placement, for example can be proportional to this. For this a corresponding process variable can be associated with a defined value of the placement, for example the magnitude of a difference vector of the joint angle of the manipulator. In the example cited above, for instance, the path velocity can be predetermined by the angle position of the end effector, meaning that a defined velocity $dx/dt$ corresponds to each angle.

In a second embodiment, a modification of the process variable is associated with a defined value of the placement, such that the manipulator increases its velocity (for example) as long as an operator generates a placement action. Here as well the change can take place proportional to the placement action, meaning that larger placement actions more significantly change the process variable. In contrast to the first embodiment, in this case a return to the original process variable requires not only a withdrawal of the placement but additionally subsequent placement in the opposite direction.

Since the placement action (in particular to a desired position that is unfamiliar to the operator) is difficult for the operator to intuitively detect, a regulation is advantageously implemented to reduce the placement. If the operator releases the manipulator, as a result of the regulation this naturally returns independently to its desired position in null space. This is advantageous when the desired positions are predetermined to avoid collision of the redundant manipulator, for example. The second embodiment described in the preceding is simplified since the manipulator returns to its desired position in null space when the operator no longer exerts force on it, such that the process variable is modified until the operator actively moves the manipulator out of its desired position in null space and the manipulator subsequently travels on with the modified process variable.

Alternatively, a regulation can also be implemented that forms the basis of a position in null space that forms the basis of a new desired value. This is particularly advantageous with the first embodiment described above, in which the operator can predetermine a process variable via selection of one of the possible manipulator positions in null space. For example, for this motor moments can be calculated using a mathematical ersatz model of the manipulator and the new manipulator position predetermined by the operator, and the motor moments can be supplied as desired values to a force regulator, which desired values significantly compensate the weight, friction and/or dynamic forces and keep the manipulator in the new, predetermined position.

The process variable (for example the path velocity) is preferably modified corresponding to a value and/or direction of the registered placement. A modification corresponding to the magnitude value, for example the magnitude of a difference vector in the joint angles, enables travelling the path with varying velocities that can be predetermined intuitively by the operator via greater or smaller placements. A modification corresponding to the direction in particular enables a travelling of the predetermined path in the reverse direction.

The manipulator can travel the predetermined path in a position-regulated manner. For example, for this the desired positions in null space can be predetermined and approached in succession via proportional differential integral (PID) regulators.

The manipulator can also be similarly force-regulated. For example, for this the torques required in the motors of the manipulator to travel the predetermined paths can be calculated using a mathematical ersatz model and be supplied as desired values to force regulators of the motors.

Given both position-regulated and force-regulated manipulators, it is advantageous to regulate this flexibly so that an operator can manually change the position of the manipulator in null space. For example, this can be realized in conventional industrial robots with PID individual joint regulation by reducing the proportional component and deactivating the integral regulator. In force-regulated manipulators, desired values can be predetermined to force regulators of the motors, which desired values essentially compensate for only the inertial, friction and gravitational forces of the manipulator.

The placement can be detected using movements and/or forces in joints of the manipulator. The movement axes of a manipulator normally has a position detection capability, for example by rotation sensors or the like. Using the change in the individual joints, a placement of the manipulator in null space can then be detected. Forces that an operator exerts on the manipulator in order to move it into its null space can similarly also be measured insofar as corresponding force sensors are present. Inverse force pairs—i.e. torques—are thereby likewise presently designated as forces in general.

In a preferred embodiment of the present invention, a steering handle is provided that is permanently or detachably fastened to the manipulator. At this steering handle an operator can specifically bring about a placement of the manipulator in its null space by moving the manipulator by means of the steering handle. Due to such a steering handle, it is intuitively clear to the operator where and in what direction the operator must move the manipulator in order to generate a placement. In the steering handle, operating elements (for example a safety element) can preferably be provided that must be actively operated in order to enable a travel of the manipulator, a movement of the manipulator in null space by the operator or a manual change to the process variable.

DESCRIPTION OF THE PREFERRED EMBODIMENTS

Figure 1:
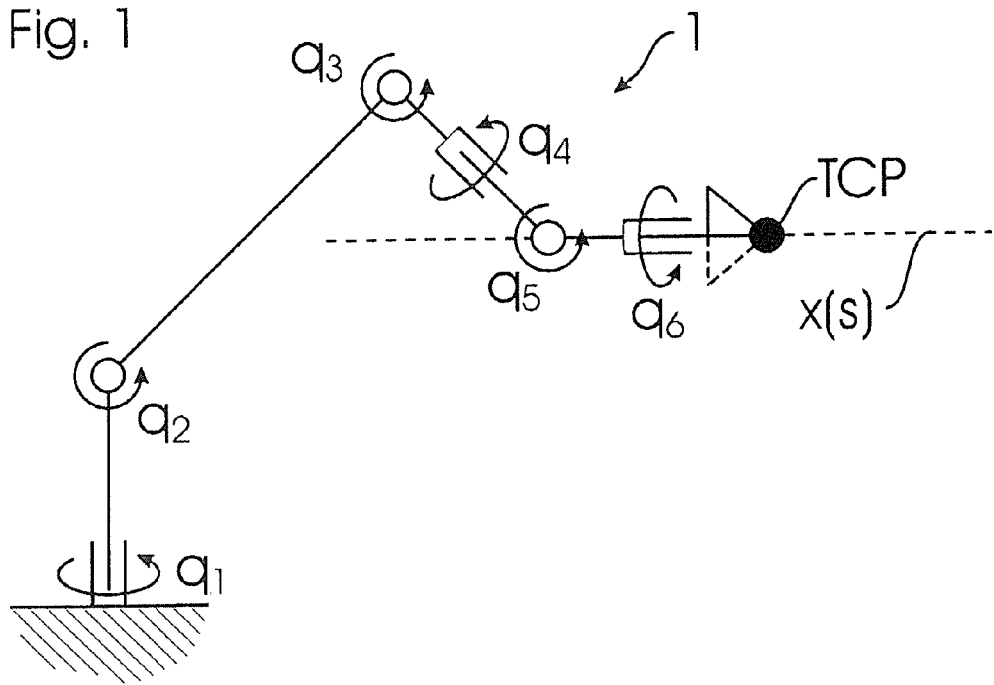
FIG. 1 shows a six-axis manipulator according to one embodiment of the present invention.

FIG. 1 shows a manipulator in the form of a six-axis robot 1 according to one embodiment of the present invention. Its position is described by the joint angle $q=[q1, q2, \ldots q6]$.

The end effector of the robot 1, symbolized by the tool center point TCP, should travel a predetermined horizontal path x(s) that is indicated in dashed lines in FIG. 1. The angle q6 of the end effector TCP is thereby not predetermined since a tool (not shown) attached to this is rotationally symmetrical to the sixth, last movement axis of the robot 1. For example, the attitude $x \in R^5$ of the end effector TCP can therefore be described by three Cartesian coordinates and the two angles relative to the plane of the drawing or, respectively, to the horizontal in the plane of the drawing of FIG. 1.

The six-axis robot 1 is therefore redundant relative to the predetermined path x(s). This means that it can realize a predetermined attitude x(s) of the end effector TCP (that is defined by only the joint angles $q1, \ldots, q5$) via infinitely many different manipulator positions $(q1, \ldots, q5, q6 \in [0, 2n])$ that emerge from one another via rotation of the end effector TCP around the sixth movement axis and together form the null space of the robot 1 relative to the predetermined path x(s).

Two of these manipulator positions that are all associated with the same end effector attitude are shown in FIG. 1. A first position q is thereby traversed; a second position q' is shown in dashed lines. Each position is described by a vector of the joint angle: $q [q1, q2, \ldots q6=0]$; $q'=[q1', q2', \ldots q6'=n]$.

The position (q6=0) traversed in FIG. 1 should be predetermined as a desired position q in null space since the end effector TCP was correspondingly directed during teaching.

By default, in operation the robot travels the predetermined path x(s) with its end effector TCP with a constant velocity $dx/dt=v$. For this new desired values q1desired, ..., q5desired for the first five movement axes must be supplied every 10 ms to the proportional integral regulators (not shown), such that the robot 1 respectively travels into the new position q and thereby moves its end effector TCP along the path x(s).

A purely proportional regulator (not shown) whose proportionality constant is selected so low that an operator can manually rotate the end effector TCP around the sixth movement axis is connected to the sixth axis.

In a control device (not shown) of the robot 1, among other things the joint angle q6real is registered. If the operator now rotates the end effector TCP while the robot 1 traverses the path x(s), the control device registers the placement qreal–qdesired that (in the exemplary embodiment) forms a vector $[0, \ldots, 0, q6real-q6desired]$. Its absolute value |q6real–q6desired| is scaled linearly so that a rotation of 0° from the desired attitude corresponds to a factor of K=1, a rotation of +180° corresponds to a factor of K=2 and a rotation of −180° corresponds to a factor of K=0. The control device now moves the end effector with a constant velocity K×v in that, for example, the next desired values q1desired, ..., q5desired are supplied to the regulators every 5 ms for the first five movement axis, for example given K=2. If the operator correspondingly rotates the end effector by −180°, the robot 1 temporarily brings the end effector TCP to a complete halt. If the operator rotates the end effector even further, for example by 360° in total, the end effector TCP traverses the predetermined path x(s) in reverse with velocity −v in that now the already traversed desired positions for the first five movement axes are successively provided in reverse order every 10 ms as new desired values.

If the operator releases the end effector TCP, the proportional regulator for the sixth axis rotates the end effector into the desired attitude 16desired=0 again; the control device correspondingly changes the path velocity to v again since the factor K has returned to 1.

Figure 2:
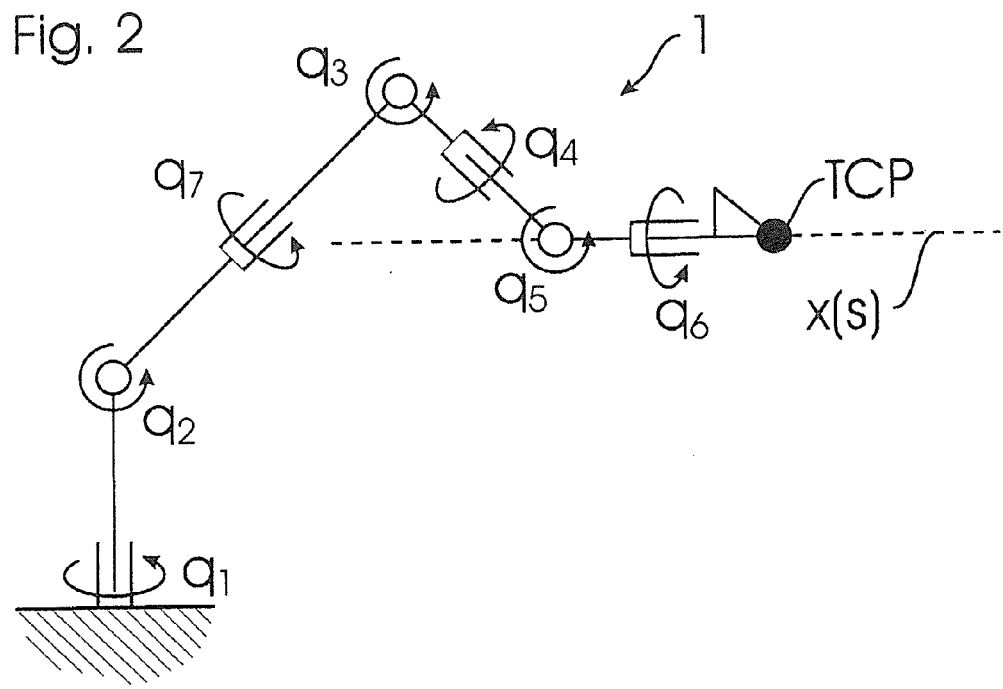
FIG. 2 shows a seven-axis manipulator according to a further embodiment of the present invention.

In a depiction corresponding to FIG. 1, FIG. 2 shows a manipulator in the form of a seven-axis robot 1 according to a further embodiment of the present invention. Its position is described correspondingly by the joint angles $q=[q1, q2, \ldots, q7]$. Elements corresponding to the embodiment according to FIG. 1 are thereby designated by the same reference characters, such that the preceding statements can be referenced for their explanation and only the differences are discussed in the following.

In the further embodiment the end effector TCP should in turn traverse the path x(s), wherein this time its orientation is also predetermined by the path drawn with dashed lines, however, in order to direct a grinding wheel (not shown) along a surface, for example. For example, the attitude x∈$R^6$ of the end effector TCP is therefore described by the position of the end effector in space and its orientation, defined by three Euler angles. However, since the robot 1 has seven joints, it is redundant, meaning that the predetermined attitude x of the end effector can be represented by infinitely many different manipulator positions that emerge from one another via rotation of the remaining robot 1 around the last movement axis of a fixed end effector 6 given an inertially fixed base, and that together form the null space. In the path planning, the energy-optimal position in which the robot 1 must apply the least static and dynamic forces is determined as a desired position in null space.

The robot 1 possesses an admittance regulator that enables the elbow (which is formed by the fourth joint with the joint angle q3) to be moved manually, wherein the end effector TCP maintains its predetermined attitude x.

If the operator now moves the elbow in the direction of the predetermined path, i.e. to the right in FIG. 2, as described in the preceding the control device increases the velocity dx/dt (with which the end effector travels the predetermined path x(s)) corresponding to the placement, i.e. the magnitude of the difference vector qreal−qdesired. If the operator releases the elbow, the admittance regulation guides it back into the desired position, whereby the path velocity is reduced to the initial value again. In contrast to this, if the operator moves the elbow counter to the predetermined path (to the left in FIG. 2), i.e. if the operator "holds" the robot traveling the path at the elbow, as described in the preceding the control device reduces the velocity dx/dt (with which the end effector travels the predetermined path x(s)) corresponding to the placement, i.e. the magnitude of the difference vector qreal−qdesired. If the operator thereby moves the elbow correspondingly far counter to the predetermined path, the robot 1 comes to a complete halt (i.e. reduces its velocity to zero) or even travels the already-traversed path x(s) backwards.

Via the present invention it is therefore enabled to simply and directly (and therefore correspondingly comfortably) modify the velocity with which a robot that is redundant relative to a predetermined path travels said path.

Figure 3:
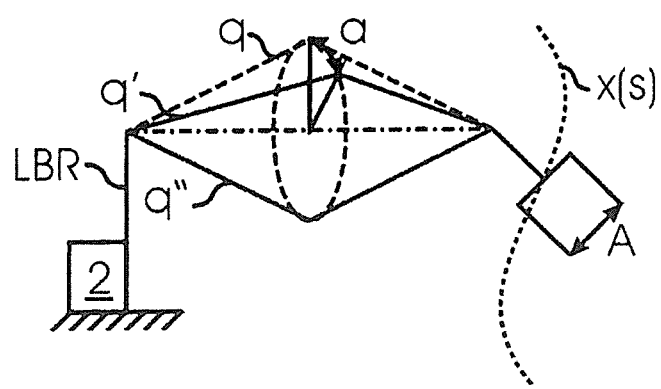
FIG. 3 shows a lightweight construction robot according to a further embodiment of the present invention.
Figure 4:
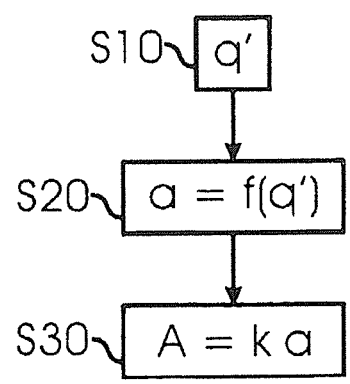
FIG. 4 is a workflow diagram of a method according to one embodiment of the present invention.

FIG. 3 shows (in a significantly schematic perspective representation) a lightweight construction robot LBR of the German Center for Air and Space Travel upon traveling a predetermined path x(s) with the tool center point of its gripper. The shown gripper attitude can realize the LBR via multiple manipulator positions that are respectively uniquely determined by its joint angles, and of which a first manipulator position defined by the joint angle q is drawn in a dashed line, a second manipulator position defined by the joint angle q' is drawn in a solid line and a third manipulator position defined by the joint angle q" is drawn in a dotted line.

In this exemplary embodiment, the angle a between the vertical and the perpendicular from the elbow of the LBR to the connecting line between shoulder and carpal joint is selected as a placement, which angle amounts to 0° in the first manipulator position, 30° in the second manipulator position and 180° in the third manipulator position.

The operator can now handle the LBR at the elbow in an elasticity regulation and move it into its null space along a curve shown in a dashed line in FIG. 3 without the end effector attitude being changed. In a control device 2 of the LBR the joint angles q' that result in the manipulator position into which the operator moves the LBR are now acquired in Step S10 while traveling the predetermined path x(s). From this the control device 2 calculates the angle a based on the known kinematics of the LBR and opens the gripper to a clear width A that results in that the angle a is multiplied with a constant k set in advance by the operator. If the operator thus moves the LBR at the elbow along the curve (shown in a dashed line) from the first manipulator position into the second manipulator position in its null space given an invariant end effector attitude, the initially closed gripper opens. If the operator moves the LBR at the elbow further along the curve (shown in a dashed line) from the second manipulator position into the third manipulator position given an invariant end effector attitude, the gripper opens even further. As an alternative to the gripper opening, the velocity can naturally also be modified along the path x(s) as in the preceding exemplary embodiments.

I claim as my invention:

1. A method for controlling travel of an end effector of a robotic manipulator along a predetermined path in which said manipulator has a null space, with at least two manipulator settings being associated with a same end effector attitude, said method comprising the steps of:
    in a computerized processor, registering placement of the manipulator in said null space wherein said placement is a direct manipulation of said manipulator within said null space; and
    in said processor, automatically modifying at least one process variable corresponding to the registered placement, wherein said at least one process variable is modified without varying an attitude of the end effector with respect to said predetermined path.

2. A method as claimed in claim 1 comprising entering into said processor a desired manipulator position that is predetermined in the null space with regard to each end effector attitude and, in said processor, automatically determining a difference between the desired manipulator position and an actual manipulator position, and registering said difference as a placement.

3. A method as claimed in claim 2 comprising, in said processor, automatically implementing a regulation algorithm to reduce said placement.

4. A method as claimed in claim 1 comprising, in said processor, automatically modifying said process variable corresponding to at least one of a value of the registered placement and a direction of the registered placement.

5. A method as claimed in claim 4 comprising, in said processor, modifying said process variable proportionally to the registered placement.

6. A method as claimed in claim 1 comprising, via said processor, automatically regulating a position of said manipulator.

7. A method as claimed in claim 6 comprising flexibly regulating said manipulator from said processor.

8. A method as claimed in claim 1 comprising, from said processor, automatically regulating said manipulator dependent on forces experienced by said manipulator.

9. A method as claimed in claim 8 comprising flexibly regulating said manipulator from said processor.

10. A method as claimed in claim 1 comprising registering said placement according to at least one of movements and forces that occur in joints of the manipulator.

11. A method as claimed in claim 10 comprising registering said placement according to forces experienced in said joints of said manipulator as represented by a mathematical simulation model of the manipulator.

12. A method as claimed in claim 1 comprising, in said processor, reducing a path velocity of said travel of said end effector substantially to zero in a placement.

13. A method as claimed in claim 1 comprising, in said processor, automatically modifying a passage direction of said predetermined path in a placement.

14. A control device for a robotic manipulator having an end effector, said control device comprising:
- a processor configured to control said robotic manipulator to cause said end effector to travel along a predetermined path having a null space, with at least two manipulator settings being associated with a same end effector attitude;
- a detection device that registers a placement of the manipulator in null space and that supplies an input representing said placement to said processor wherein said placement is a direct manipulation of said manipulator within said null space; and
- said processor being configured to modify a process variable corresponding to the placement registered by the detection device, wherein said at least one process variable is modified without varying an attitude of the end effector with respect to said predetermined path.

15. A control device as claimed in claim 14 comprising a steering handle that moves said manipulator in null space from a first manipulator position into a second, different manipulator position that is associated with said same end effector attitude.

16. A manipulator system comprising:
- a robotic manipulator having an end effector;
- a processor configured to control said robotic manipulator to cause said end effector to travel along a predetermined path having a null space, with at least two manipulator settings being associated with a same end effector attitude;
- a detection device that registers a placement of the manipulator in null space and that supplies an input representing said placement to said processor wherein said placement is a direct manipulation of said manipulator within said null space; and
- said processor being configured to modify a process variable corresponding to the placement registered by the detection device, wherein said at least one process variable is modified without varying an attitude of the end effector with respect to said predetermined path.

* * * * *